United States Patent
Suzuki et al.

(10) Patent No.: US 10,894,527 B2
(45) Date of Patent: Jan. 19, 2021

(54) IN-VEHICLE DEVICE, RECORDING MEDIUM, AND KEYLESS ENTRY SYSTEM

(71) Applicant: ALPS ALPINE CO., LTD., Tokyo (JP)

(72) Inventors: Yasuhiro Suzuki, Miyagi (JP); Satoshi Hayasaka, Miyagi (JP); Satoshi Nakajima, Miyagi (JP); Chengchun Fang, Detroit, MI (US)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/452,844

(22) Filed: Jun. 26, 2019

(65) Prior Publication Data

US 2020/0017073 A1    Jan. 16, 2020

Related U.S. Application Data

(60) Provisional application No. 62/696,112, filed on Jul. 10, 2018.

(51) Int. Cl.
*B60R 25/24* (2013.01)
*H04B 17/318* (2015.01)
(Continued)

(52) U.S. Cl.
CPC ......... *B60R 25/245* (2013.01); *H04B 17/318* (2015.01); *H04W 4/025* (2013.01); *H04W 4/48* (2018.02); *G06F 17/11* (2013.01)

(58) Field of Classification Search
CPC ... B60R 25/245; H04W 4/025; H04B 17/318; G01S 11/06; G07C 9/00309
(Continued)

(56) References Cited

U.S. PATENT DOCUMENTS

| 7,286,835 | B1 | 10/2007 | Dietrich et al. |
| 10,235,823 | B1 * | 3/2019 | Saleh ................. G07C 9/00309 |

(Continued)

FOREIGN PATENT DOCUMENTS

| JP | 2007-532026 | 11/2007 |
| JP | 2008-017455 | 1/2008 |

(Continued)

OTHER PUBLICATIONS

Japanese Office Action for 2019-121778 dated Aug. 4, 2020.
Japanese Office Action for 2019-121778 dated Oct. 20, 2020.

*Primary Examiner* — Vernal U Brown
(74) *Attorney, Agent, or Firm* — IPUSA, PLLC

(57) ABSTRACT

An in-vehicle device includes a plurality of transmitting antennas, an in-vehicle device transmitter configured to transmit measurement signals via the plurality of respective transmitting antennas, an in-vehicle device receiver configured to receive, from a portable device, a measurement result signal that includes measurement data of received signal strengths of the respective measurement signals that have been transmitted from the plurality of respective transmitting antennas; and an in-vehicle device controller configured to calculate first distances from the portable device to a plurality of preset areas, based on differences between the received signal strengths of the respective measurement signals included in the measurement result signal, and to identify an area to which the portable device belongs from the plurality of preset areas based on the first distances.

9 Claims, 8 Drawing Sheets

(51) Int. Cl.
*H04W 4/02* (2018.01)
*H04W 4/48* (2018.01)
*G06F 17/11* (2006.01)

(58) Field of Classification Search
USPC ........................................................ 340/5.72
See application file for complete search history.

(56) References Cited

U.S. PATENT DOCUMENTS

| | | |
|---|---|---|
| 2005/0014511 A1 | 1/2005 | Spain |
| 2006/0240843 A1 | 10/2006 | Spain, Jr. et al. |
| 2007/0188301 A1* | 8/2007 | Nakajima ............... B60R 25/24 340/5.61 |
| 2008/0106375 A1 | 5/2008 | Nakajima et al. |
| 2014/0226503 A1 | 8/2014 | Cooper et al. |
| 2017/0190317 A1 | 7/2017 | Hamada et al. |

FOREIGN PATENT DOCUMENTS

| | | |
|---|---|---|
| JP | 2008-115648 | 5/2008 |
| JP | 2014-157151 | 8/2014 |
| JP | 2016-020580 | 2/2016 |

\* cited by examiner

IN-VEHICLE DEVICE, RECORDING MEDIUM, AND KEYLESS ENTRY SYSTEM

CROSS-REFERENCE TO RELATED APPLICATIONS

This application claims the benefit of U.S. provisional application No. 62/696,112, filed on Jul. 10, 2018, the entire contents of which are incorporated herein by reference.

BACKGROUND OF THE INVENTION

1. Field of the Invention

The disclosures herein relate to an in-vehicle device, a recording medium, and a keyless entry system.

2. Description of the Related Art

Conventionally, keyless entry systems that include in-vehicle devices installed in vehicles and portable devices carried by users have been utilized. In the keyless entry systems, in order to control turning on or off of lamps and locking and unlocking of a vehicle, it is important to identify the location of a portable device (a user) with respect to the vehicle. Conventionally, a method for identifying the location of a portable device with respect to a vehicle has been proposed. In the conventional method, an in-vehicle device transmits measurement signals from a plurality of respective transmitting antennas, the portable device measures received signal strength indicator (RSSI) of each of the measurement signals, and transmits a measurement result signal that includes measurement data of the received signal strengths, and the in-vehicle device identifies the location of the portable device based on the received signal strengths included in the measurement result signal.

However, the above-described conventional method has a problem in that the received signal strength measured by portable devices differs depending on the types of the portable devices, and thus, the accuracy of identifying the location of a portable device may be decreased.

RELATED-ART DOCUMENTS

Patent Documents

Patent Document 1: Japanese Laid-Open Patent Publication No. 2008-115648

SUMMARY OF THE INVENTION

It is a general object of the present invention to provide a keyless entry system that accurately identifies the location of a portable device based on signal strengths of received measurement signals, regardless of the type of the portable device.

According to at least one embodiment, an in-vehicle device includes a plurality of transmitting antennas, an in-vehicle device transmitter configured to transmit measurement signals via the plurality of respective transmitting antennas, an in-vehicle device receiver configured to receive, from a portable device, a measurement result signal that includes measurement data of received signal strengths of the respective measurement signals that have been transmitted from the plurality of respective transmitting antennas; and an in-vehicle device controller configured to calculate first distances from the portable device to a plurality of preset areas, based on differences between the received signal strengths of the respective measurement signals included in the measurement result signal, and to identify an area to which the portable device belongs from the plurality of preset areas based on the first distances.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

According to an embodiment, it is possible to provide a keyless entry system that accurately identifies the location of a portable device based on signal strengths of received measurement signals, regardless of the type of the portable device.

In the following, embodiments of the present invention will be described with reference to the accompanying drawings. In the specification and drawings, elements having substantially the same functions or configurations are referred to by the same numerals, and a duplicate description thereof will be omitted.

First Embodiment

Figure 1:
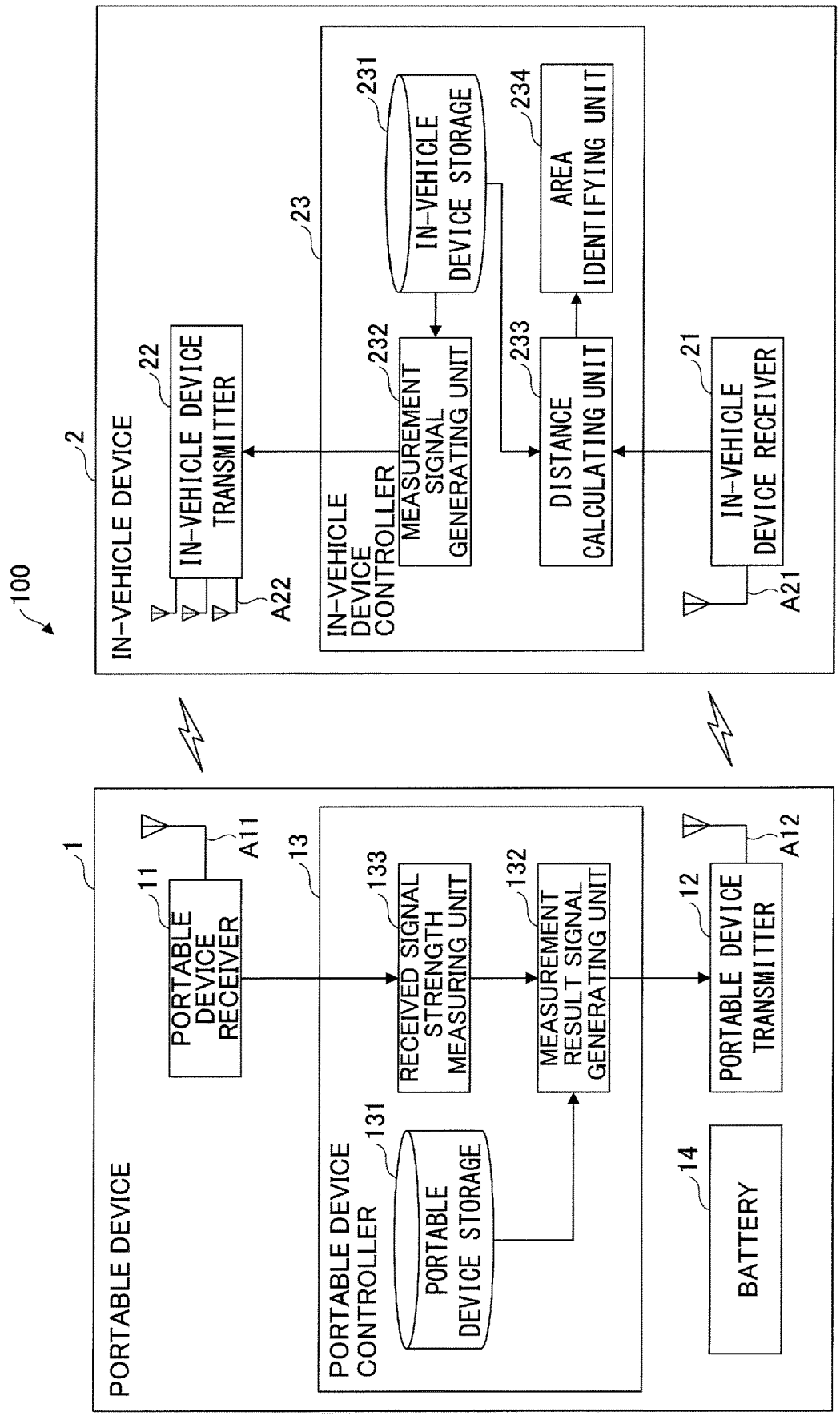
FIG. 1 is a diagram illustrating an example of a configuration of a keyless entry system.

A keyless entry system 100 according to a first embodiment will be described with reference to FIG. 1 to FIG. 7. First, a configuration of the keyless entry system 100 will be described. FIG. 1 is a diagram illustrating an example of the configuration of the keyless entry system 100. The keyless entry system 100 of FIG. 1 includes a portable device 1 and an in-vehicle device 2.

First, a hardware configuration of the portable device 1 will be described. The portable device 1 is a wireless terminal that wirelessly communicates with the in-vehicle device 2, and is carried by a user (a driver, for example) of the keyless entry system 100. The portable device 1 may be a dedicated terminal or a portable terminal such as a smartphone or a tablet terminal. The portable device 1 illustrated in FIG. 1 includes a receiving antenna A11, a portable device receiver 11, a transmitting antenna A12, a portable device transmitter 12, a portable device controller 13, and a battery 14.

The receiving antenna A11 is an antenna connected to the portable device receiver 11. The receiving antenna A11 receives a wireless signal transmitted from the in-vehicle device 2, converts the received wireless signal into an electrical signal, and inputs the electrical signal into the portable device receiver 11. The receiving antenna A11 may be a three-axis antenna having three antennas arranged perpendicular to each other, but is not limited thereto.

The portable device receiver 11 is a receiving circuit that receives a wireless signal transmitted from the in-vehicle device 2 via the receiving antenna A11, and is connected to the portable device controller 13. The wireless signal received by the portable device receiver 11 includes a measurement signal R wirelessly transmitted from the in-vehicle device 2. The measurement signal will be described later. The portable device receiver 11 includes, for example, a low-noise amplifier, a filter, a mixer, and a demodulator circuit. When the portable device receiver 11 receives a wireless signal via the receiving antenna A11, the portable device receiver 11 performs predetermined signal processing on an electrical signal converted by the receiving antenna A11, and inputs the electrical signal into the portable device controller 13.

The transmitting antenna A12 is an antenna connected to the portable device transmitter 12. The transmitting antenna A12 converts an electrical signal input from the portable device transmitter 12 into a wireless signal, and transmits the wireless signal to the in-vehicle device 2. The transmitting antenna A12 may be a three-axis antenna having three antennas arranged perpendicular to each other, but is not limited thereto.

The portable device transmitter 12 is a transmitting circuit that transmits a wireless signal to the in-vehicle device 2 via the transmitting antenna A12, and is connected to the portable device controller 13. The wireless signal transmitted from the portable device transmitter 12 includes a measurement result signal A. The measurement result signal A is a wireless signal for identifying the location of the portable device 1 (the user) with respect to the in-vehicle device 2 (the vehicle), and includes signal strengths x of measurement signals R received at the portable device receiver 11. As will be described below, the location of the portable device 1 with respect to the in-vehicle device 2 is identified based on the signal strengths x of the received measurement signals R included in the measurement result signal A. Examples of the wireless signal transmitted from the portable device transmitter 12 include, but are not limited to, a 315 MHz ultra-high frequency (UHF) signal and a 2.4 GHz Bluetooth (registered trademark) signal. The portable device transmitter 12 includes for example, a modulator, a mixer, a filter, and a power amplifier. When an electrical signal is input from the portable device controller 13, the portable device transmitter 12 performs predetermined processing such as modulation of the electrical signal, and wirelessly transmits the electrical signal via the transmitting antenna A12.

The receiving antenna A11 and the transmitting antenna A12 may be separate antennas. Alternatively, one antenna may be shared between the receiving antenna A11 and the transmitting antenna A12. The portable device 1 may include one or more receiving antennas A11 and one or more transmitting antennas A12. Further, the portable device receiver 11 and the portable device transmitter 12 may be separate integrated circuits (ICs) or may be integrated into a wireless module (such as a Bluetooth module).

The portable device controller 13 is hardware for controlling the entire operation of the portable device 1, and includes a central processing unit (CPU), a read-only memory (ROM), and a random-access memory (RAM). The CPU controls components of the portable device 1 and implements functions of the portable device controller 13 by executing programs. The programs executed by the CPU may be recorded on any computer-readable recording medium, such as a compact disc (CD), a DVD, or a flash memory. The ROM stores the programs executed by the CPU and various types of data. The RAM provides a working area for the CPU. The portable device controller 13 is, for example, a microcontroller, but is not limited thereto.

The battery 14 provides power to the portable device receiver 11, the portable device transmitter 12, and the portable device controller 13.

The configuration of the portable device 1 is not limited to the example illustrated in FIG. 1. For example, if the portable device 1 is a dedicated terminal, the portable device 1 may include a locking button and an unlocking button that allow the user to manually lock and unlock the vehicle. In addition, if the portable device 1 is a portable terminal, the portable device 1 may include input devices such as a touch panel and a microphone and output devices such as a liquid crystal display and a speaker.

Next, a hardware configuration of the in-vehicle device 2 will be described. The in-vehicle device 2 is a wireless terminal that wirelessly communicates with the portable device 1, and is installed in a vehicle. The in-vehicle device 2 is connected to an electronic control unit (ECU) of the vehicle via an in-vehicle network such as a controller area network (CAN) or a local interconnect network (LIN), and controls the vehicle in response to a wireless signal transmitted from the portable device 1. In addition, the in-vehicle device 2 is supplied with power from a battery of the vehicle. The in-vehicle device 2 illustrated in FIG. 1 includes a receiving antenna A21, an in-vehicle device receiver 21, a plurality of transmitting antennas A22, an in-vehicle device transmitter 22, and an in-vehicle device controller 23.

The receiving antenna A21 is an antenna connected to the in-vehicle device receiver 21. The receiving antenna A21 receives a wireless signal transmitted from the portable device 1, converts the received wireless signal into an electrical signal, and inputs the electrical signal into the in-vehicle device receiver 21. The receiving antenna A21 may be a three-axis antenna having three antennas arranged perpendicular to each other, but is not limited thereto.

The in-vehicle device receiver 21 is a receiving circuit that receives a wireless signal transmitted from the portable device 1 via the receiving antenna A21, and is connected to the in-vehicle device controller 23. The wireless signal received by the in-vehicle device receiver 21 includes a measurement result signal A wirelessly transmitted from the portable device 1. The in-vehicle device receiver 21 includes, for example, a low-noise amplifier, a filter, a mixer, and a demodulator circuit. When the in-vehicle device receiver 21 receives a wireless signal via the receiving antenna A21, the in-vehicle device receiver 21 performs predetermined signal processing on an electrical signal converted by the receiving antenna A21, and inputs the electrical signal into the in-vehicle device controller 23.

The transmitting antennas A22 are connected to the in-vehicle device transmitter 22. Each of the transmitting antennas A22 converts an electrical signal input from the in-vehicle device transmitter 22 into a wireless signal, and transmits the wireless signal to the portable device 1. The transmitting antennas A22 may be a three-axis antenna having three antennas arranged perpendicular to each other, but is not limited thereto. In the example of FIG. 1, the in-vehicle device 2 includes three transmitting antennas A22; however, the in-vehicle device 2 may include two transmitting antennas A22 or four or more transmitting antennas A22.

The in-vehicle device transmitter 22 is a transmitting circuit that transmits a wireless signal to the portable device 1 via the transmitting antennas A22, and is connected to the in-vehicle device controller 23. The wireless signal transmitted from the in-vehicle device transmitter 22 includes a measurement signal R. The measurement signal R is a wireless signal for identifying the location of the portable device 1 (the user) with respect to the in-vehicle device 2 (the vehicle). The measurement signal R includes a measurement portion (a portion whose transmitted signal strength is constant), and a signal strength x of the received measurement portion is measured. As will be described below, the location of the portable device 1 with respect to the in-vehicle device 2 is identified based on signal strengths x of received measurement signals R measured by the portable device 1. The portable device 1 measures signal strengths x of received measurement portions included in measurement signals R as signal strengths x of the received measurement signals R. Examples of the wireless signal transmitted from the in-vehicle device transmitter 22 include, but are not limited to, a 125 kHz low-frequency (LF) signal and a 2.4 GHz Bluetooth (registered trademark) signal. The in-vehicle device transmitter 22 includes for example, a modulator, a mixer, a filter, and a power amplifier. When an electrical signal is input from the in-vehicle device controller 23, the in-vehicle device transmitter 22 performs predetermined processing such as modulation of the electrical signal, and wirelessly transmits the electrical signal via the transmitting antennas A22.

The receiving antenna A21 and the transmitting antennas A22 may be separate antennas. Alternatively, one antenna may be shared between the receiving antenna A21 and the transmitting antennas A22. The in-vehicle device 2 may include one or more receiving antennas A21. Further, the in-vehicle device receiver 21 and the in-vehicle device transmitter 22 may be separate integrated circuits (ICs) or may be integrated into a wireless module (such as a Bluetooth module).

The in-vehicle device controller 23 is hardware for controlling the entire operation of the in-vehicle device 2, and includes a CPU, ROM, and a RAM. The CPU controls components of the in-vehicle device 2 and implements functions of the in-vehicle device controller 23 by executing programs. The programs executed by the CPU may be recorded on any computer-readable recording medium, such as a CD, a DVD, or a flash memory. The ROM stores the programs executed by the CPU and various types of data. The RAM provides a working area for the CPU. The in-vehicle device controller 23 is, for example, a microcontroller, but is not limited thereto.

The configuration of the in-vehicle device 2 is not limited to the example illustrated in FIG. 1. For example, the in-vehicle device 2 may include a battery for supplying power to the in-vehicle device receiver 21, the in-vehicle device transmitter 22, and the in-vehicle device controller 23. In addition, in the example of FIG. 1, the in-vehicle device 2 includes the one in-vehicle device transmitter 22 connected to the plurality of transmitting antennas A22, but may include a plurality of in-vehicle device transmitters 22 connected to the plurality of respective transmitting antennas A22.

Figure 2:
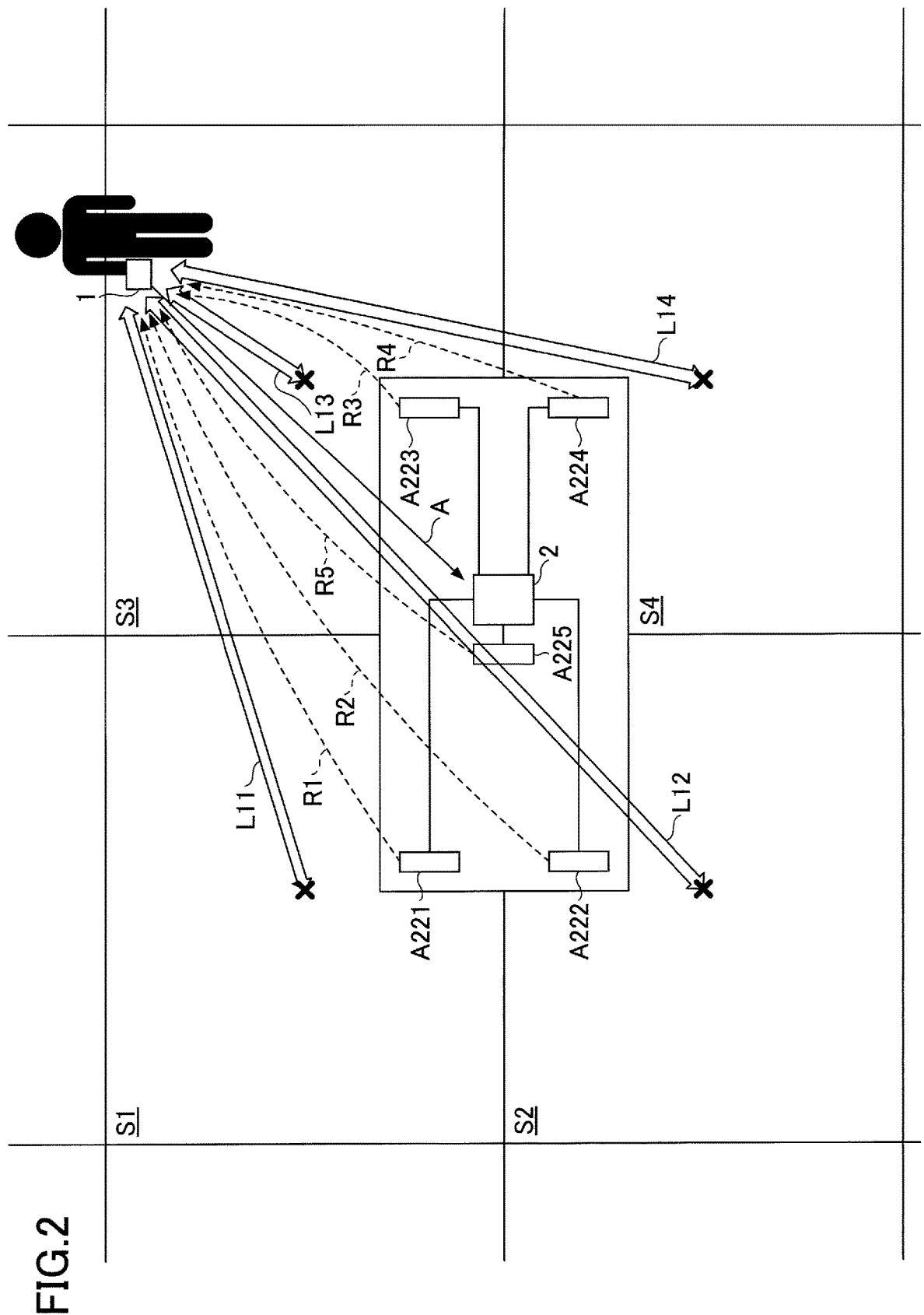
FIG. 2 is a diagram illustrating an overview of the operation of the keyless entry system.

Next, an overview of the operation of the keyless entry system 100 will be described. FIG. 2 is a diagram illustrating an overview of the operation of the keyless entry system 100. In the example of FIG. 2, the in-vehicle device 2 includes four transmitting antennas A221 to A224 disposed at the four corners of the vehicle, and a transmitting antenna A225 disposed at the center of the vehicle. The other components of the in-vehicle device 2 are collectively arranged at the center of the vehicle, and are connected to the transmitting antennas A221 to A225 via the in-vehicle network. In addition, a three-dimensional space within a given distance from the vehicle is divided to form several tens of areas around the vehicle without any gaps. Each of the areas has one representative point. In the example of FIG. 2, for convenience of explanation, four areas S1 to S4 are illustrated. The areas S1 to S4 are preset in order to identify the location of the portable device 1. Hereinafter, the transmitting antennas A221 to A225 may be, if not distinguished, referred to as transmitting antenna(s) A22, and the areas S1 to S4 may be, if not distinguished, referred to as area(s) S.

In the present embodiment, the in-vehicle device 2 transmits measurement signals R1 to R5 from the transmitting antennas A221 to A225, respectively. When the portable device 1 has received the measurement signal R1, the portable device 1 measures a signal strength x1 of the received measurement signal R1. The same applies to the measurement signals R2 to R5. The portable device 1 receives measurement signals R over a predetermined period of time, and transmits a measurement result signal A that includes signal strengths x of the measurement signals R received over the predetermined period of time. When the in-vehicle device 2 has received the measurement result signal A, the in-vehicle device 2 calculates differences d between the received signal strengths x included in the measurement result signal A.

For example, as the differences d, the in-vehicle device 2 calculates differences between each pair of a reference received signal strength xi and another received signal strength xj ($d\_ij = xi - xj$). The reference received signal strength xi is a received signal strength x of a measurement signal R that has been transmitted from an $i^{th}$ transmitting antenna A22, and the other received signal strength xj is a received signal strength x of a measurement signal R that has been transmitted from a $j^{th}$ transmitting antenna A22 ($i \neq j$). If the differences d are differences between each pair of a reference received signal strength xi and another received signal strength xj, the n−1 number of differences are calculated. n represents the number of transmitting antennas A22 of the in-vehicle device 2. Preferably, the reference received signal strength xi is a received signal strength x of a measurement signal R that has been transmitted from a transmitting antenna A22 installed at the center of the vehicle. This allows an offset to be equally removed from the other received signal strengths xj. Details of the offset will be described later. In the example of FIG. 2, if the received signal strength xi is a received signal strength x5, the following four differences d are calculated.

$$d1 = d\_51 = x5 - x1$$

$$d2 = d\_52 = x5 - x2$$

$$d3 = d\_53 = x5 - x3$$

$$d4 = d\_54 = x5 - x4$$

Further, as the differences d, differences between each received signal strength xi and another received signal strength xj may be calculated ($d\_ij = xi - xj$). If the differences d are differences between each received signal strength xi and another received signal strength xj, the (n×(n−1))/2 number of differences are calculated. n represents the number of transmitting antennas A22 of the in-vehicle device 2. In the example of FIG. 2, the following 10 differences d are calculated.

$$d1=d\_21=x2-x1$$

$$d2=d\_31=x3-x1$$

$$d3=d\_32=x3-x2$$

$$d4=d\_41=x4-x1$$

$$d5=d\_42=x4-x2$$

$$d6=d\_43=x4-x3$$

$$d7=d\_51=x5-x1$$

$$d8=d\_52=x5-x2$$

$$d9=d\_53=x5-x3$$

$$d10=d\_54=x5-x4$$

The in-vehicle device 2 calculates distances L1 (first distances) from the portable device 1 to the areas S based on the difference d calculated as described above. Herein, a distance to an area S means a distance to a representative point of the area S, as will be described below.

In general, even if portable devices receive the same measurement signal R at the same position, the received signal strength x measured by each of the portable devices differs due to characteristics of a receiving antenna A11 and a portable device receiver 11 of each of the portable devices. If portable devices are dedicated terminals, a deviation in received signal strength x between the portable devices may be small. However, if portable devices are portable terminals such as different types (models) of smartphones, a deviation in received signal strength x between the portable devices may become large. A deviation in received signal strength x between portable devices can be approximated to a constant offset. Thus, when two portable devices 1A and 1B receive the same measurement signal R at the same position, signal strengths x measured by the two portable devices 1A and 1B can be represented as follows.

Portable device 1A: x
Portable device 1B: x'=x+ofs ofs represents an offset (deviation) of a received signal strength x' of the portable device 1B relative to a received signal strength x of the portable device 1A. Conventionally, a method for calculating distances from a portable device to areas S based on received signal strengths x is known; however, in the conventional method, an offset of received signal strengths x between portable devices is not taken into account. Specifically, in the above example, a distance from the portable device 1A to an area S is calculated based on the received signal strength x, and a distance from the portable device 1B to the area S is calculated based on the received signal strength x' (=x+ofs). As a result, even if the portable devices 1A and 1B are located at the same position, different values would be calculated as the distance from the portable devices 1A and 1B to the area S.

In light of the above, according to the present embodiment, the distances L1 are calculated by using differences d, instead of using received signal strengths x that may be affected by offsets between portable devices. For example, if the received signal strength x' of the portable device 1B is the sum of the received signal strength x of the portable device 1A and an offset ofs (x'=x+ofs), a difference d_ij for the portable device 1A is expressed as xi−xj, and a difference d'_ij for the portable device 1B is expressed as xi'−xj'=(xi+ofs)−(xj+ofs)=xi−xj. As a result, the offset ofs is removed from the difference d'_ij, and thus, the difference d'_ij for the portable device 1B corresponds to the difference d_ij for the portable device 1A. Accordingly, effects of offsets between portable devices can be suppressed by using differences d, allowing the distances L1 that are independent of offsets between portable devices to be calculated.

For example, the in-vehicle device 2 calculates Mahalanobis distances MD as the distances L1. The Mahalanobis distances MD (distances L1) from the portable device 1 to the areas S are calculated by the following formulas.

$$MD^2 = [\, d_1 - \mu_1 \; \cdots \; d_N - \mu_N \,] \begin{bmatrix} r_{11} & \cdots & r_{N1} \\ \vdots & \ddots & \vdots \\ r_{1N} & \cdots & r_{NN} \end{bmatrix}^{-1} \begin{bmatrix} d_1 - \mu_1 \\ \vdots \\ d_N - \mu_N \end{bmatrix} \quad (1)$$

$$r_{kl} = \frac{1}{m1} \sum_{p=1}^{m1} (X_{kp} \times X_{lp}) \quad (2)$$

$$X_{kp} = \frac{d_{kp} - \mu_k}{\sigma_k} \quad (3)$$

In the formulas (1) to (3), $d_k$ represents a $k^{th}$ difference d calculated by the in-vehicle device 2 (k=1 to N). If the differences d are differences between each pair of a reference received signal strength xi and another received signal strength xj, N=n−1. If the differences d are differences between each received signal strength xi and another received signal strength xj, N=(n×(n−1))/2. $d_{kp}$ represents a $p^{th}$ difference $d_k$ calculated based on signal strengths x of received measurement signals R that have been measured before the vehicle is put on the market by measuring instruments (such as the most commonly used portable instruments) belonging to areas S. m1 represents the number of differences $d_{kp}$ (p=1 to m1). $\mu_k$ represents an average value of the differences $d_{kp}$ ($\mu_k = \Sigma d_{kp}/m1$). $\mu_k$ corresponds to a reference value for the difference $d_k$. $\sigma_k$ represents the standard deviation of $d_{kp}$. If the distances L1 are the Mahalanobis distances MD, $\mu_k$ and $r_{kl}$ are preliminarily stored in the ROM of the in-vehicle device controller 23 as reference values and coefficients for the areas S to be used to calculate the distance L1. It should be noted that parameters such as $d_{kp}$ may be prepared beforehand for each vehicle production lot or for each vehicle.

In the example of FIG. 2, a reference value $\mu_k$ and a coefficient $r_{kl}$ for the area S1 and difference(s) $d_k$ calculated based on received signal strengths x included in a measurement result signal A are substituted into the formula (1) to calculate a distance L11 (a Mahalanobis distance MD) from the portable device 1 to the area S1. The same applies to the areas S2 to S4.

Further, as the distances L1, the in-vehicle device 2 may calculate Euclidean distances ED. The Euclidean distances ED (distances L1) from the portable device 1 to the areas S are calculated by the following formula.

$$ED=(d_1-\mu_1)^2+(d_2-\mu_2)^2+ \ldots +(d_N-\mu_N)^2 \quad (4)$$

In the formula (4), $\mu_k$ represents the same as the above. If the distances L1 are the Euclidean distances ED, $\mu_k$ values are preliminarily stored in the ROM of the in-vehicle device controller 23 as reference values for the respective areas S to be used to calculate the distances L1.

In the example of FIG. 2, the in-vehicle device 2 calculates a distance L11 (a Euclidean distance ED) from the portable device 1 to the area S1 by substituting a reference value $\mu_k$ for the area S1 and difference(s) $d_k$ calculated based on received signal strengths x included in a measurement result signal A into the formula (4). The same applies to the areas S2 to S4.

After the in-vehicle device 2 calculates the distances L1 from the portable device 1 to the areas S1 to S4, the in-vehicle device 2 identifies an area S whose distance L1 is minimal from among the areas S1 to S4, as an area S to which the portable device 1 belongs (namely, as the location of the portable device 1). In the example of FIG. 2, the area S3 is identified as the area S to which the portable device 1 belongs. It should be noted that when the minimal distance L is equal to or exceeds a threshold Lth, the in-vehicle device 2 may determine that the portable device 1 does not belong to any of the areas S.

In the above example, the Mahalanobis distances MD and the Euclidean distances ED have been described as the distances L1; however, the distances L are not limited to the Mahalanobis distances MD and the Euclidean distances ED. The in-vehicle device 2 may use any method as long as the distances L1 can be calculated based on differences d. Further, the number and the arrangement of the transmitting antennas A22 and the areas S are not limited to the example of FIG. 2. In addition, in the example of FIG. 2, the in-vehicle device 2 includes the one in-vehicle device transmitter 22; however, the in-vehicle device 2 may include a plurality of in-vehicle device transmitters 22 provided for the respective transmitting antennas A22. Further, the transmitting antennas A22 and other components may be connected wirelessly or via a dedicated cable instead of the in-vehicle network.

Next, a functional configuration of the portable device controller 13 will be described. The portable device controller 13 of FIG. 1 includes a portable device storage 131, an measurement result signal generating unit 132, and a received signal strength measuring unit 133. These functions are implemented by causing the CPU of the portable device controller 13 to execute a program and work with other hardware.

The portable device storage 131 is provided in at least one of the ROM and the RAM of the portable device controller 13. The portable device storage 131 stores a portable device ID that is identification information of the portable device 1, an in-vehicle device ID that is identification information of the in-vehicle device 2 associated with the portable device 1, data for wirelessly communicating with the in-vehicle device 2, and other data. The portable device ID and the in-vehicle device ID may be MAC addresses, but are not limited thereto.

The measurement result signal generating unit 132 generates a measurement result signal A (an electrical signal) that includes signal strengths x of measurement signals R received at the portable device receiver 11 for each predetermined period of time, and the measurement result signal generating unit 132 inputs the generated measurement result signal A into the portable device transmitter 12.

The received signal strength measuring unit 133 measures the signal strengths x of the measurement signals R received at the portable device receiver 11, and inputs the measured signal strengths x of the received measurement signals R into the measurement result signal generating unit 132.

Next, a functional configuration of the in-vehicle device controller 23 will be described. The in-vehicle device controller 23 of FIG. 1 includes an in-vehicle device storage 231, a measurement signal generating unit 232, a distance calculating unit 233, and an area identifying unit 234. These functions are implemented by causing the CPU of the in-vehicle device controller 23 to execute a program and work with other hardware.

The in-vehicle device storage 231 is provided in at least one of the ROM and the RAM of the in-vehicle device controller 23. The in-vehicle device storage 231 stores an in-vehicle device ID that is identification information of the in-vehicle device 2, a portable device ID that is identification information of the portable device 1 associated with the in-vehicle device 2, data for wirelessly communicating with the portable device 1, antenna IDs that are identification information of the transmitting antennas A22, data (a reference value and a coefficient set for each area S) used to calculate distances L1, and other data.

The measurement signal generating unit 232 generates a measurement signal R (an electrical signal) for each predetermined period of time, and inputs the generated measurement signal R into the in-vehicle device transmitter 22.

The distance calculating unit 233 calculates differences d between received signal strengths x included in a measurement result signal A received at the in-vehicle device receiver 21, and calculates distances L1 from the portable device 1 to the areas S based on the calculated differences d and the reference values $\mu_k$ set for the areas S. The differences d and the distances L1 are calculated as described above. The distance calculating unit 233 inputs the calculated distances L1 into the area identifying unit 234.

The area identifying unit 234 identifies an area S to which the portable device 1 belongs (namely, the location of the portable device 1) based on the distances L1 from the portable device 1 to the areas S.

Next, an operation of the keyless entry system 100 according to the present embodiment will be described. In the following, a standard for wireless communication between the portable device 1 and the in-vehicle device 2 is assumed to be Bluetooth.

Figure 3:
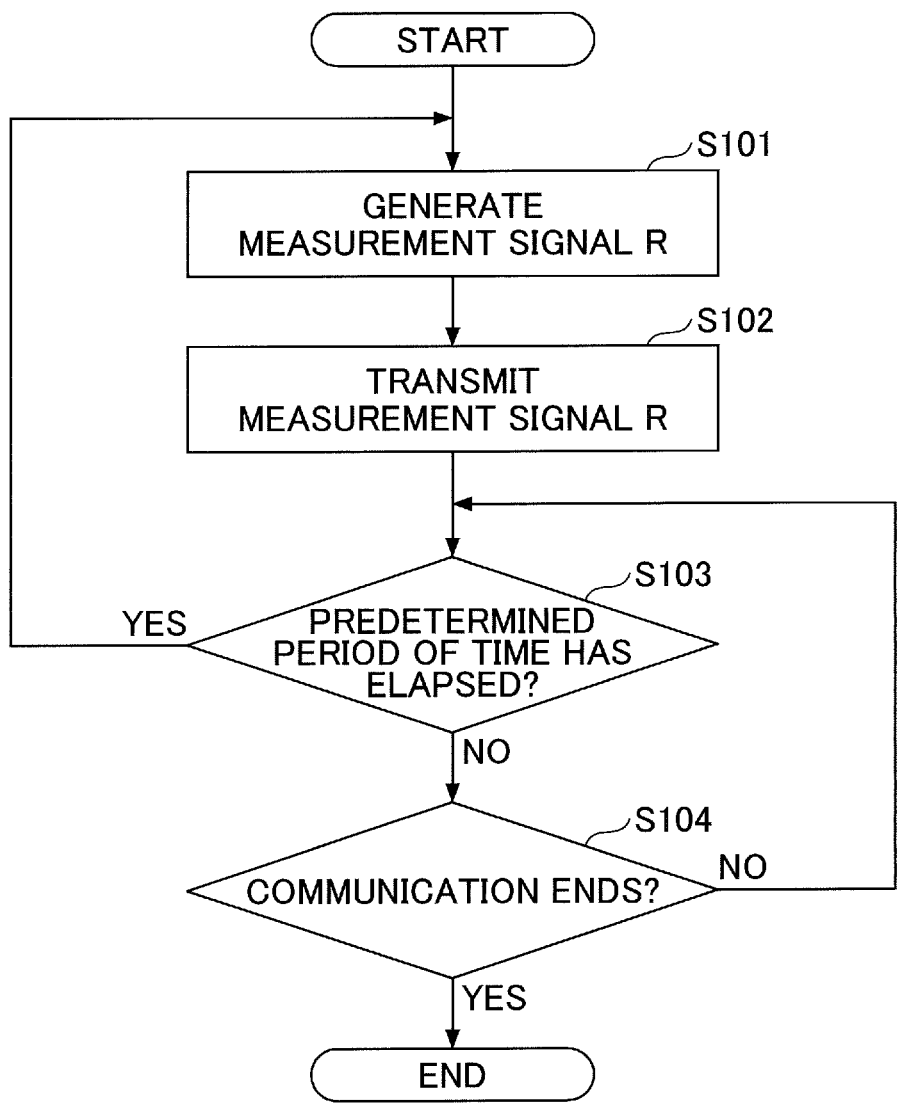
FIG. 3 is a flowchart illustrating an example of a transmitting process performed by an in-vehicle device for a measurement signal R.

First, a transmitting process performed by the in-vehicle device 2 for a measurement signal R will be described. FIG. 3 is a flowchart illustrating an example of a transmitting process performed by the in-vehicle device 2 for a measurement signal R. The transmitting process illustrated in FIG. 3 is initiated upon the connection of the in-vehicle device 2 to the portable device 1. In the following, it is assumed that measurement signals R are transmitted in the order from the transmitting antennas A221 to A225.

Upon the connection of the in-vehicle device 2 to the portable device 1, the measurement signal generating unit 232 reads, from the in-vehicle device storage 231, the in-vehicle device ID, the portable device ID, and the antenna ID of the transmitting antenna A221 from which to transmit a measurement signal R1. Then, the measurement signal generating unit 232 generates a measurement signal R1 that includes the read in-vehicle device ID (transmission source), the portable device ID (transmission destination), the antenna ID of the transmitting antenna A221, and a measurement portion (step S101). The measurement signal generating unit 232 inputs the generated measurement signal R1 into the in-vehicle device transmitter 22.

When the measurement signal R1 is input, the in-vehicle device transmitter 22 wirelessly transmits the measurement signal R1 from the transmitting antenna A221 (step S102). The in-vehicle device transmitter 22 may refer to the antenna ID included in the measurement signal R1 to select the transmitting antenna A221 as a transmitting antenna A22 from which to transmit the measurement signal R1. Alternatively, the measurement signal generating unit 232 may instruct the in-vehicle device transmitter 22 to transmit the measurement signal R1 from the transmitting antenna A221.

When a predetermined period of time has elapsed after the transmission of the measurement signal R1 (yes in S103), the process returns to the step S101, and the measurement signal generating unit 232 generates a measurement signal R2. The in-vehicle device transmitter 22 wirelessly transmits the measurement signal R2 from the transmitting antenna A222. Subsequently, the in-vehicle device 2 sequentially transmits measurement signal R3 to R5 each time the predetermined period of time has elapsed. When the in-vehicle device 2 transmits the measurement signal R5, the in-vehicle device 2 transmits measurement signals again starting from a measurement signal R1. The in-vehicle device 2 repeats steps S101 to S103 until the communication with the portable device 1 ends. When the communication with the portable device 1 ends (yes in S104), the in-vehicle device 2 ends the transmitting process illustrated in FIG. 3.

With the above process, it becomes possible for the in-vehicle device transmitter 22 to transmit a measurement signal R via a corresponding transmitting antenna A22 of the plurality of the transmitting antennas A22 each time the predetermined period of time has elapsed. It should be noted that the order of transmitting the measurement signals R from the transmitting antennas A22 may be set as desired.

Figure 4:
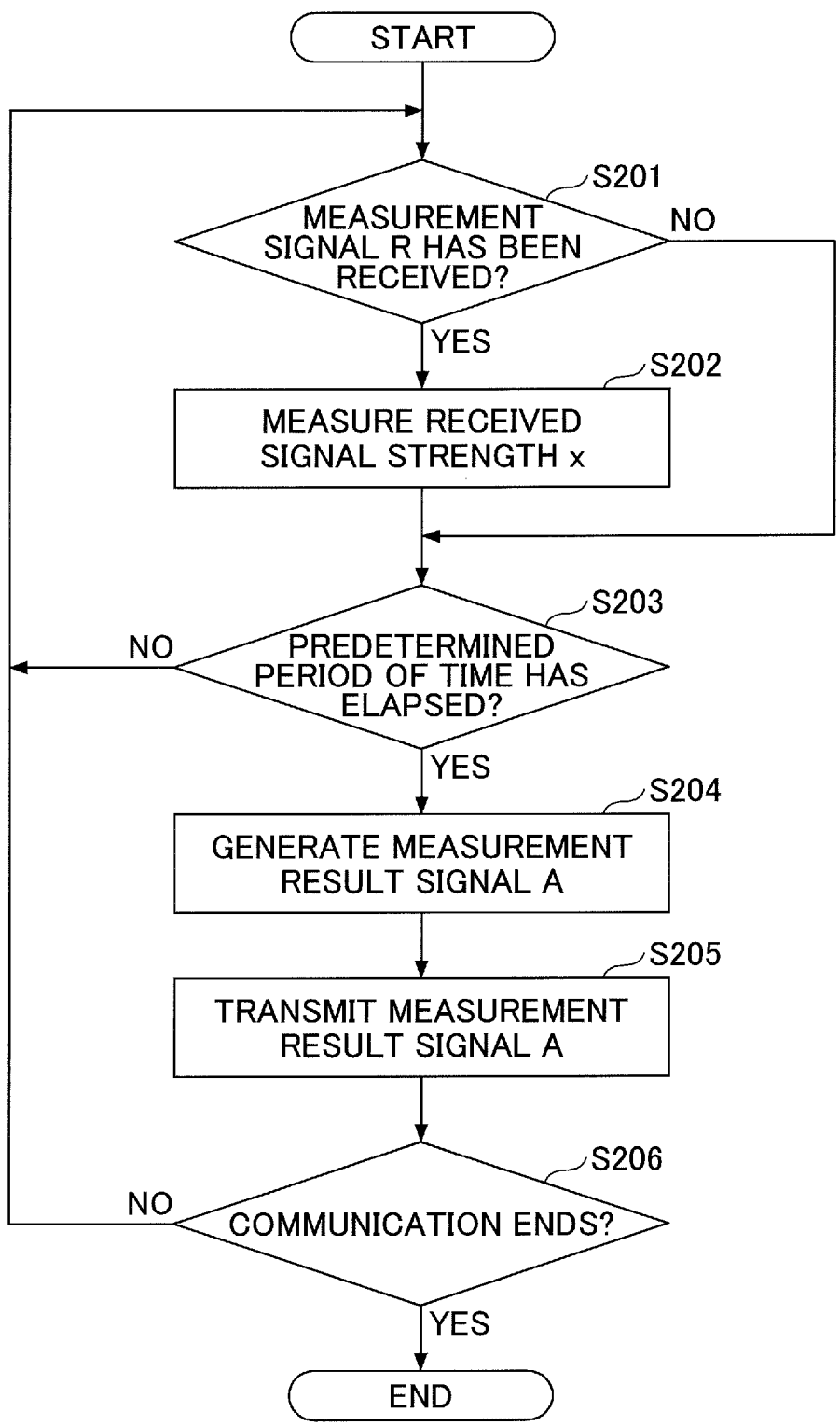
FIG. 4 is a flowchart illustrating an example of a transmitting/receiving process performed by a portable device.

Next, a transmitting/receiving process performed by the portable device 1 will be described. FIG. 4 is a flowchart illustrating an example of a transmitting/receiving process performed by the portable device 1. The transmitting/receiving process illustrated in FIG. 4 is initiated upon the connection of the portable device 1 to the in-vehicle device 2.

Upon the connection of the portable device 1 to the in-vehicle device 2, the portable device receiver 11 starts receiving a measurement signal R from the in-vehicle device 2 (step S201). When a measurement signal R has been received from the in-vehicle device 2 (yes in step S201), the portable device receiver 11 inputs the received measurement signal R into the received signal strength measuring unit 133.

When the measurement signal R is input, the received signal strength measuring unit 133 measures a received signal strength x of (a measurement portion of) the input measurement signal R, associates the measured received signal strength x with an antenna ID included in the input measurement signal R, and inputs the received signal strength x into the measurement result signal generating unit 132 (step S202). The portable device 1 repeats steps S201 and S202 until a predetermined period of time has elapsed. The period of time during which the portable device receiver 11 receives measurement signals R is set such that the measurement signals R1 to R5 can be received.

When the predetermined period of time has elapsed (yes in step S203), the measurement result signal generating unit 132 reads, from the portable device storage 131, the portable device ID and the in-vehicle device ID. The measurement result signal generating unit 132 then generates a measurement result signal A that includes the read portable device ID (transmission source) and the in-vehicle device ID (transmission destination), and also includes the received signal strengths x that have been associated with the respective antenna IDs and input from the received signal strength measuring unit 133 for the predetermined period of time (step S204). The measurement result signal generating unit 132 inputs the generated measurement result signal A into the portable device transmitter 12.

When the measurement result signal A is input, the portable device transmitter 12 wirelessly transmits the input measurement result signal A from the transmitting antenna A12 (step S205). The portable device 1 repeats steps S201 to S205 until the communication with the in-vehicle device 2 ends. When the communication with the in-vehicle device 2 ends (yes in step S206), the portable device 1 ends the transmitting/receiving process illustrated in FIG. 4.

With the above process, it becomes possible for the portable device 1 to transmit a measurement result signal A each time the predetermined period of time has elapsed. When the portable device receiver 11 receives the measurement signals R1 to R5 from the transmitting antenna A221 to A225 during the predetermined period of time, the measurement result signal A includes the signal strengths x1 to x5 of all the received measurement signals R1 to R5. Conversely, when the portable device receiver 11 is unable to receive measurement signals R from one or more transmitting antennas A22, the measurement result signal A does not include signal strengths x of the not-received measurement signals R transmitted from the one or more transmitting antennas A22.

Figure 5:
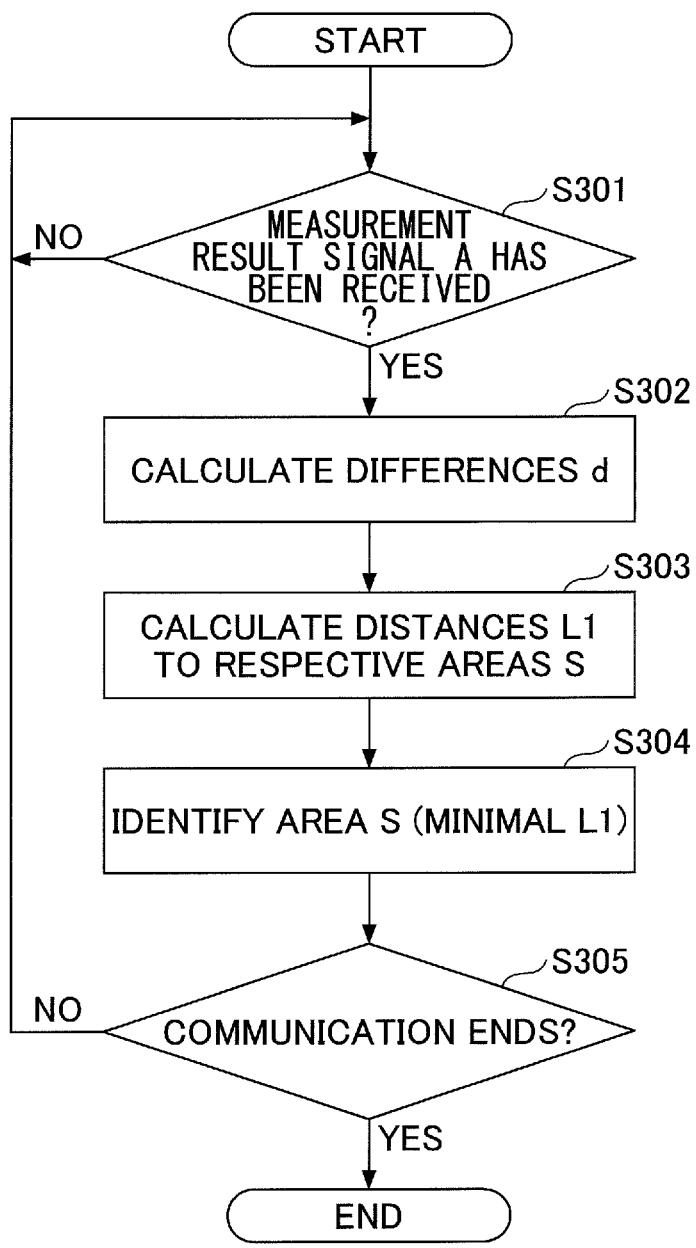
FIG. 5 is a flowchart illustrating an example of a receiving process performed by the in-vehicle device for a measurement result signal A.

Next, a receiving process performed by the in-vehicle device 2 for a measurement result signal A will be described. FIG. 5 is a flowchart illustrating an example of a receiving process performed by the in-vehicle device 2 for a measurement result signal A. The receiving process illustrated in FIG. 5 is initiated upon the connection of the in-vehicle device 2 to the portable device 1. It should be noted that the receiving process illustrated in FIG. 5 may be performed concurrently with the transmitting process illustrated in FIG. 3, or the receiving process illustrated in FIG. 5 and the transmitting process illustrated in FIG. 3 may be alternately performed. Further, distances L1 are assumed to be Mahalanobis distances.

Upon the connection of the in-vehicle device 2 to the portable device 1, the in-vehicle device receiver 21 starts receiving a measurement result signal A from the portable device 1 (step S301). When a measurement result signal A has been received from the portable device 1 (yes in step S301), the in-vehicle device receiver 21 inputs the received measurement result signal A into the distance calculating unit 233.

When the measurement result signal A is input, the distance calculating unit 233 calculates a plurality of differences based on received signal strengths x included in the input measurement result signal A (step S302).

When the differences d are calculated, the distance calculating unit 233 reads the reference values $\mu_k$ and the coefficients $r_{kl}$ set for the areas S from the in-vehicle device storage 231. The distance calculating unit 233 then substitutes the differences d and the read reference values $\mu_k$ and coefficients $r_{kl}$ into the formula (1), and calculates distances L1 from the portable device 1 to the areas S (step S303). The distance calculating unit 233 inputs the calculated distances L1 into the area identifying unit 234.

When the distances L1 are input, the area identifying unit 234 identifies an area S having a minimal distance L1 (minimal L1) as an area S to which the portable device 1 belongs (step S304). For example, if the distance L1 to the area S1 is minimal from the distances L1 to the areas S1 to S4, the area S1 is identified as an area S to which the portable device 1 belongs.

The in-vehicle device 2 repeats steps S301 to S304 until the communication with the portable device 1 ends. When the communication with the portable device 1 ends (yes in step S305), the in-vehicle device 2 ends the receiving process illustrated in FIG. 5.

With the above process, the in-vehicle device 2 calculates differences d based on received signal strengths x included in a measurement result signal A each time a measurement result signal A is received, and identifies an area S to which the portable device 1 belongs (namely, the location of the portable device 1) based on the calculated differences d. After identifying the area S to which the portable device 1 belongs, the in-vehicle device 2 may request the ECU of the vehicle to perform control according to the identified area S. For example, when the portable device 1 belongs to an area S located in the vicinity of the vehicle, the in-vehicle device 2 may request the ECU to unlock the vehicle. Further, depending on the area S, it is possible to request the ECU to turn lamps on or off or to unlock the vehicle.

As described above, according to the present embodiment, the in-vehicle device 2 calculates distances L1 from the portable device 1 to the areas S based on differences d between signal strengths x of received measurement signals R transmitted from the respective transmitting antennas A22. As described above, the differences d are not affected by offsets between portable devices, and thus, by utilizing the differences d, the in-vehicle device 2 can calculate the distances L1 that are independent of offsets between portable devices. By utilizing the distances L1 calculated as described above, the in-vehicle device 2 can accurately identify an area to which the portable device 1 belongs (the location of the portable device 1). As a result, it is possible to provide the keyless entry system 100 that accurately identifies the location of the portable device 1 based on signal strengths x of received measurement signals R, regardless of the type of the portable device 1.

Figure 6:
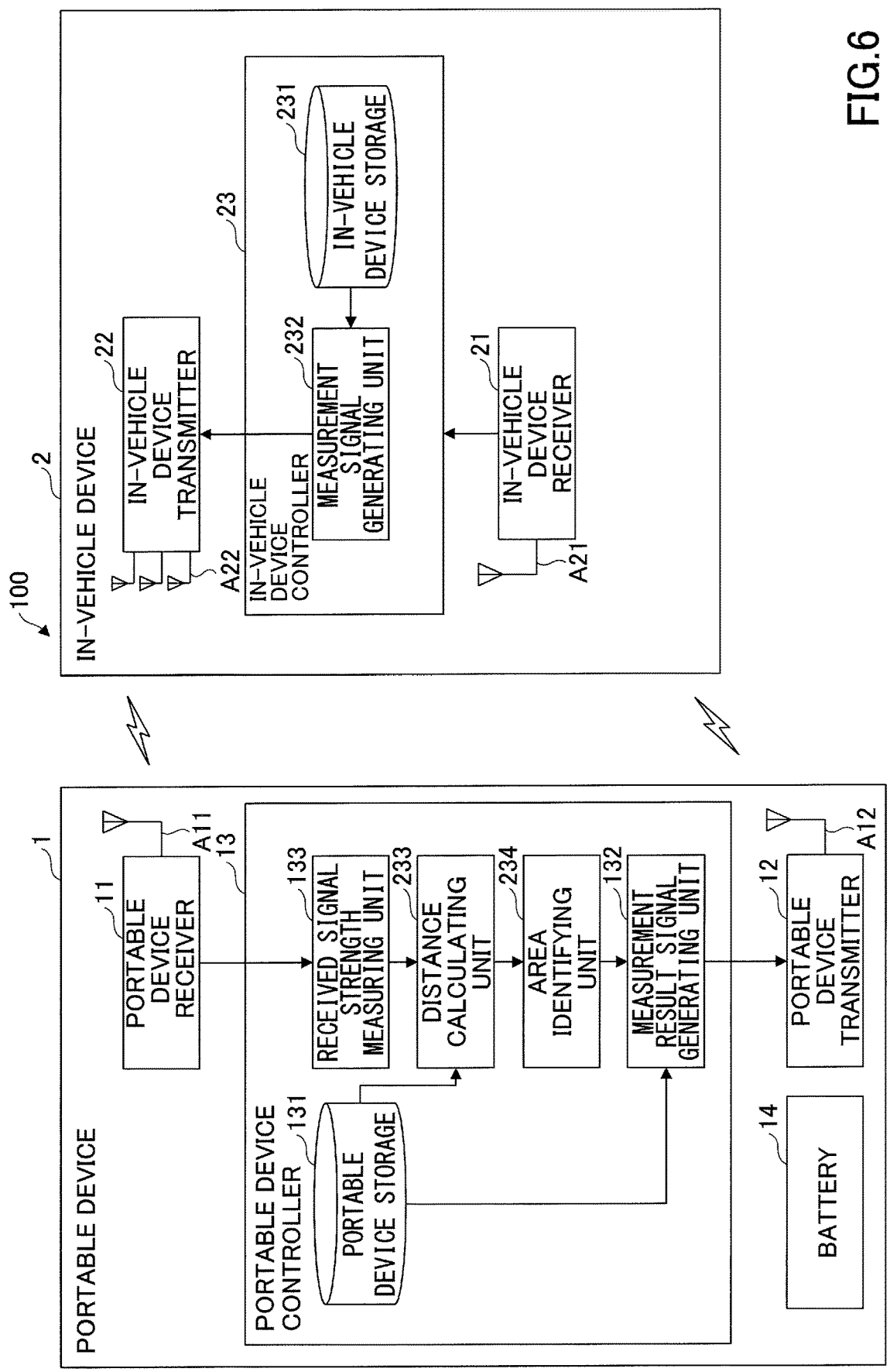
FIG. 6 is a diagram illustrating a first variation of the keyless entry system.

FIG. 6 is a diagram illustrating a first variation of the keyless entry system 100 according to the present embodiment. In the first variation, the distance calculating unit 233 and the area identifying unit 234 are provided in the portable device controller 13. The distance calculating unit 233 and the area identifying unit 234 are implemented by causing the CPU of the portable device controller 13 to execute a program and work with other hardware. In addition, the portable device storage 131 preliminarily stores reference values and coefficients for calculating distances L1, and also preliminarily stores a threshold Lth.

In the first variation, received signal strengths x measured by the received signal strength measuring unit 133 are input into the distance calculating unit 233, and the distance calculating unit 233 calculates differences d based on the received signal strengths x. The distance calculating unit 233 then calculates distances L1 from the portable device 1 to the areas S based on the calculated differences d and also based on the reference values and the coefficients stored in the portable device storage 131. The area identifying unit 234 identifies an area S to which the portable device 1 belongs, based on the distances L1 calculated by the distance calculating unit 233. The measurement result signal generating unit 132 wirelessly transmits, to the in-vehicle device 2, a measurement result signal that includes the identified area S to which the portable device 1 belongs.

According to the first variation, the portable device 1 calculates distances L1 from the portable device 1 to the areas S, based on differences d between signal strengths x of received measurement signals R transmitted from the respective transmitting antennas A22. Accordingly, the portable device 1 can calculate distances L1 that are independent of offsets between portable devices. Based on the distances L1 calculated as described above, the portable device 1 can accurately identify an area to which the portable device 1 belongs (the location of the portable device 1). As a result, it is possible to provide the keyless entry system 100 that accurately identifies the location of the portable device 1 based on signal strengths x of received measurement signals R, regardless of the type of the portable device 1.

Figure 7:
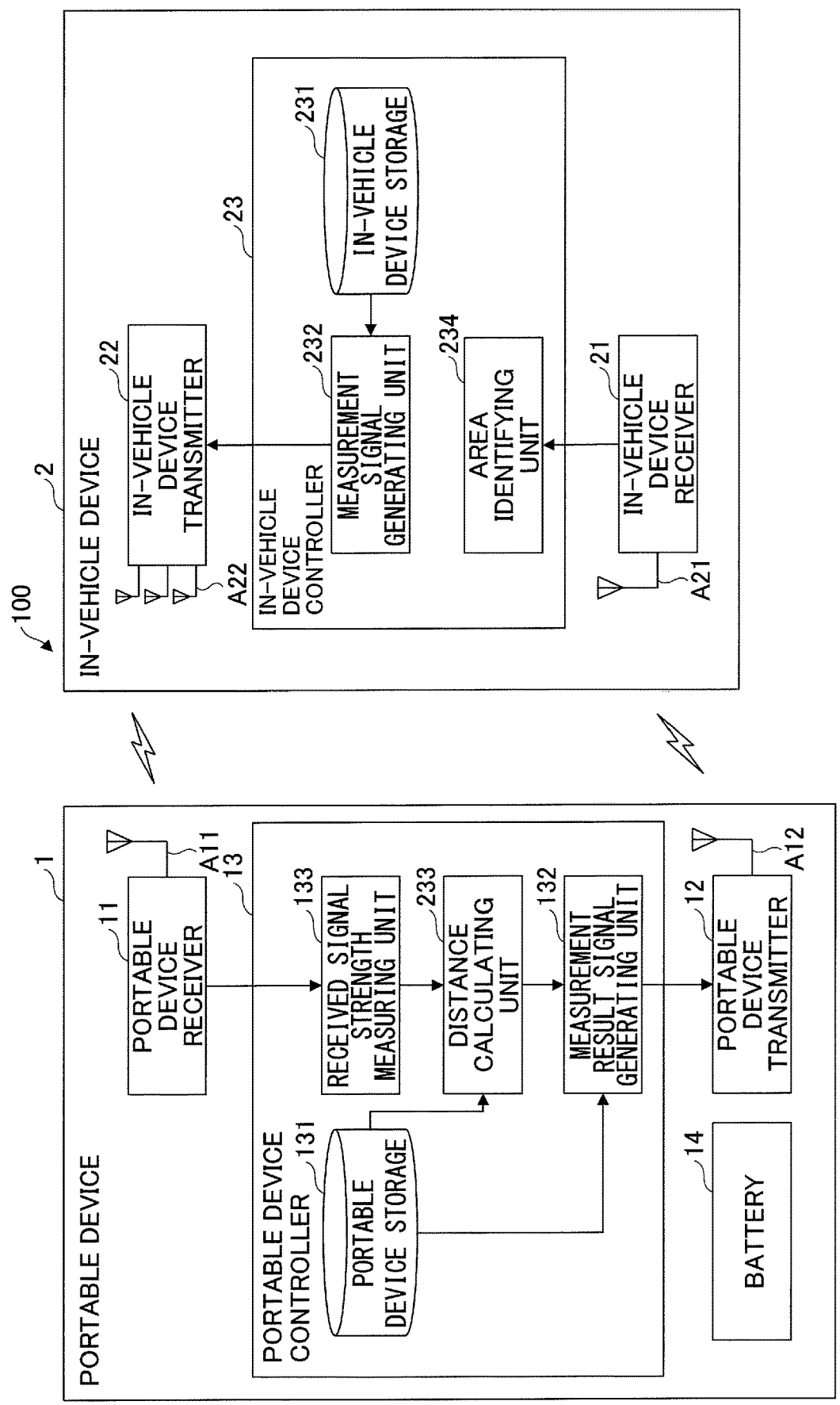
FIG. 7 is a diagram illustrating a second variation of the keyless entry system.

FIG. 7 is a diagram illustrating a second variation of the keyless entry system 100 according to the present embodiment. In the second variation, the distance calculating unit 233 is provided in the portable device controller 13. The distance calculating unit 233 is implemented by causing the CPU of the portable device controller 13 to execute a program and work with other hardware. In addition, the portable device storage 131 preliminarily stores reference values and coefficients for calculating distances L1.

In the second variation, received signal strengths x measured by the received signal strength measuring unit 133 are input into the distance calculating unit 233. The distance calculating unit 233 then calculates distances L1 from the portable device 1 to the areas S based on the calculated differences d and also based on the reference values and the coefficients stored in the portable device storage 131. The measurement result signal generating unit 132 wirelessly transmits, to the in-vehicle device 2, a measurement result signal A that includes the distances L1 calculated by the distance calculating unit 233. The area identifying unit 234 identifies an area S to which the portable device 1 belongs, based on the distances L1 included in the measurement result signal A received by the in-vehicle device receiver 21 from the portable device 1.

According to the second variation, the portable device 1 calculates distances L1 from the portable device 1 to the areas S based on differences d between signal strengths x of received measurement signals R transmitted from the respective transmitting antennas A22. Accordingly, the portable device 1 can calculate distances L1 that are independent of offsets between portable devices. Based on the distances L1 calculated as described above, the in-vehicle device 2 can accurately identify an area to which the portable device 1 belongs (the location of the portable device 1). As a result, it is possible to provide the keyless entry system 100 that accurately identifies the location of the portable device 1 based on signal strengths x of received measurement signals R, regardless of the type of the portable device 1.

Second Embodiment

Figure 8:
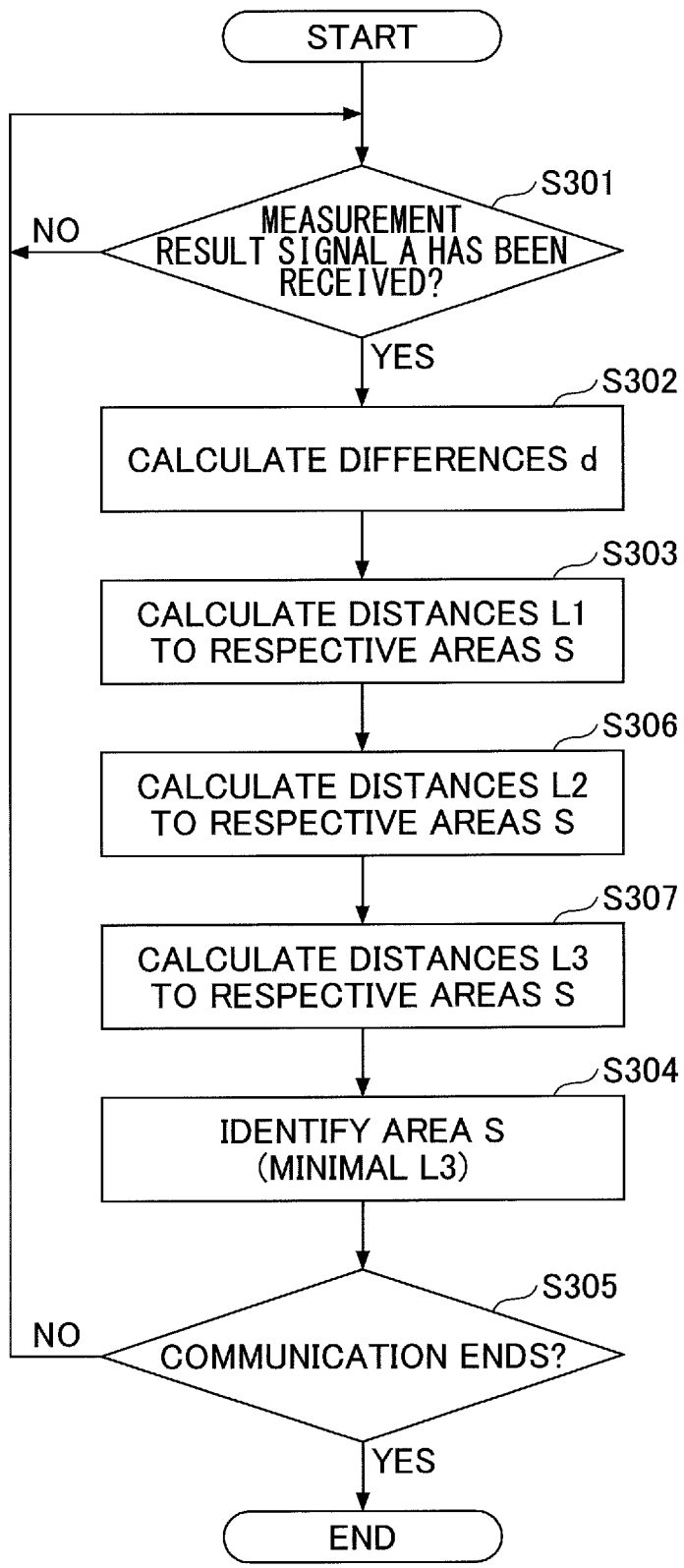
FIG. 8 is a flowchart illustrating an example of a receiving process performed by the in-vehicle device for a measurement result signal A.

A keyless entry system 100 according to a second embodiment will be described with reference to FIG. 8. The second embodiment describes the keyless entry system 100 that identifies the location of the portable device 1 by using both distances L1 and distances L2 (second distances). The keyless entry system 100 according to the second embodiment has the same configuration as that of the first embodiment, and thus a description thereof will be omitted.

In the present embodiment, the in-vehicle device 2 calculates distances L2 from the portable device 1 to the areas S based on signal strength x of received measurement signals R. For example, the in-vehicle device 2 calculates Mahalanobis distances MD as the distances L2. The Mahalanobis distances MD (distances L2) from the portable device 1 to the areas S are calculated by the following formulas.

$$MD^2 = [x_1 - \mu_1 \ \ldots \ x_n - \mu_M] \begin{bmatrix} r_{11} & \ldots & r_{M1} \\ \vdots & \ddots & \vdots \\ r_{1M} & \ldots & r_{MM} \end{bmatrix}^{-1} \begin{bmatrix} d_1 - \mu_1 \\ \vdots \\ d_M - \mu_M \end{bmatrix} \quad (5)$$

$$r_{ij} = \frac{1}{m2} \sum_{p=1}^{m2} (X_{ip} \times X_{jp}) \quad (6)$$

$$X_{ip} = \frac{x_{ip} - \mu_i}{\sigma_k} \quad (7)$$

In the formulas (5) to (7), $x_i$ represents a signal strength x of a received measurement signal R transmitted from an $i^{th}$ transmitting antenna A22 (I=1 to M). In the example of FIG. 2, M=5. $x_{ip}$ represents a signal strength xi of the received measurement signal R that has been measured $p^{th}$ (p=1 to m2) by a measuring instrument belonging to an area S. $\mu_i$ represents an average value of signal strengths $x_{ip}$ ($\mu_i = \Sigma x_{ip}/m2$). $\mu_i$ corresponds to a reference value for the signal strength xi of the received measurement signal R, which is preliminarily set for the area S. $\sigma_i$ represents the standard deviation of $x_{ip}$. If the distances L2 are the Mahalanobis distances MD, $\mu_i$ and $r_{ij}$ are preliminarily stored in the ROM of the in-vehicle device controller 23 as reference values and coefficients for the areas S to be used to calculate the distances L2 from the portable device 1.

In the example of FIG. 2, a reference value $\mu_i$ and a coefficient $r_{ij}$ for the area S1 and a received signal strength x included in a measurement result signal A are substituted into the formula (5) to calculate a distances L21 (Mahalanobis distance MD) from the portable device 1 to the area S1. The same applies to distances L22 to L24.

Further, as the distances L2, the in-vehicle device 2 may calculate Euclidean distances ED. The Euclidean distances ED (distances L2) from the portable device 1 to the areas S are calculated by the following formula.

$$ED^2 = (x_1 - \mu_1)^2 (x_2 - \mu_2)^2 + \ldots + (x_n - \mu_n)^2 \quad (8)$$

In the formula (8), $\mu_i$ represents the same as the above. If the distances L2 are the Euclidean distances ED, $\mu_i$ values of all the transmitting antennas A22i are preliminarily stored in the ROM of the in-vehicle device controller 23 as reference values for the areas S to be used to calculate the distances L2.

In the example of FIG. 2, the in-vehicle device 2 calculates a distance L21 (a Euclidean distance ED) from the portable device 1 to the area S1 by substituting a reference value $\mu_i$ and a received signal strength x included in a measurement result signal A into the formula (8). The same applies to the distances L22 to L24.

After the in-vehicle device 2 calculates the distances L1 and L2 from the portable device 1 to the areas S1 to S4, the in-vehicle device 2 calculates distances L3 from the portable device 1 to the areas S1 to S4 based on the distances L1 and L2. A distance L3 to each of the areas S is the sum of, an average of, or a weighted mean of corresponding distances L1 and L2; however, the present invention is not limited thereto. The in-vehicle device 2 identifies an area S whose distance L3 is minimal from among the areas S1 to S4, as an area S to which the portable device 1 belongs (namely, as the location of the portable device 1). It should be noted that when the minimal distance L3 is equal to or exceeds a threshold Lth, the in-vehicle device 2 may determine that the portable device 1 does not belong to any of the areas S.

In the above example, the Mahalanobis distances MD and the Euclidean distances ED have been described as the distances L2; however, the distances L2 are not limited to the Mahalanobis distances MD and the Euclidean distances ED. The in-vehicle device 2 may use any method as long as the distances L2 can be calculated based on differences d.

Next, an operation of the keyless entry system 100 according to the present embodiment will be described. In the following, a standard for wireless communication between the portable device 1 and the in-vehicle device 2 is assumed to be Bluetooth. A transmitting process performed by the in-vehicle device 2 for a measurement signal R and a transmitting/receiving process performed by the portable device 1 are the same as those of the first embodiment, and thus a description thereof will be omitted.

A receiving process performed by the in-vehicle device 2 for a measurement result signal A will be described. FIG. 8 is a flowchart illustrating an example of a receiving process performed by the in-vehicle device 2 for a measurement result signal A. The flowchart of FIG. 8 corresponds to the flowchart of FIG. 5, except that steps S306 and S307 are added between steps S303 and S304. Steps 301 through S303 are the same as the first embodiment, and thus a description thereof will be omitted. In the following, the process as of step S306 will be described.

In the present embodiment, after a measurement result signal A is input, the distance calculating unit 233 reads, from the in-vehicle device storage 231, the reference values $\mu_i$ and the coefficients $r_{ij}$ set for the areas S, and substitutes the reference values $\mu_i$, the coefficients $r_{ij}$, and received signal strengths x, included in the input measurement result signal A, into the formula (5). In this way, the distance calculating unit 233 calculates distances L2 from the portable device 1 to the areas S (step S306).

When the distances L1 and L2 are calculated, the distance calculating unit 233 calculates distances L3 from the portable device to the areas S based on the distances L1 and L2 (step S307). The distances L3 are calculated as described above. The distance calculating unit 233 inputs the calculated distances L3 into the area identifying unit 234.

When the distances L3 are input, the area identifying unit 234 identifies an area S whose distance L3 is minimal (minimal L3), as an area S to which the portable device 1 belongs (step S304). For example, if the distance L31 is minimal from the distances L31 to L34, the area S1 is identified as an area S to which the portable device 1 belongs.

The in-vehicle device 2 repeats steps S301 to S304 and steps S306 and S307 until the communication with the portable device 1 ends. When the communication with the portable device 1 ends (yes in step S305), the in-vehicle device 2 ends the receiving process illustrated in FIG. 8.

With the above process, the in-vehicle device 2 can identify an area S to which the portable device 1 belongs (namely, the location of the portable device 1), based on received signal strengths x included in a measurement result signal A each time a measurement result signal A is received. After identifying the area S to which the portable device 1 belongs, the in-vehicle device 2 may request the ECU of the vehicle to perform control according to the identified area S. For example, when the portable device 1 belongs to an area S located in the vicinity of the vehicle, the in-vehicle device 2 may request the ECU to unlock the vehicle. In addition, depending on the area S, it is possible to request the ECU to turn lamps on or off or to unlock the vehicle.

As described above, according to the present embodiment, the in-vehicle device 2 calculates distances L2 from the portable device 1 to the areas S based on signal strengths x of received measurement signals R transmitted from the respective transmitting antennas A22, and identifies an area S to which the portable device 1 belongs, based on the distances L1 and the distances L2. As described above, because the received signal strengths x include offsets between portable devices, the distances L2 would be affected by the offsets between portable devices. However, the distances L2 are utilized to increase the number of parameters for identifying an area S, and thus, the in-vehicle device 2 can identify an area to which the portable device 1 belongs (the location of the portable device 1) with higher accuracy. As a result, it is possible to provide the keyless entry system 100 that identifies the location of the portable device 1 with higher accuracy based on signal strengths x of received measurement signals R, regardless of the type of the portable device 1.

In the present embodiment, the distance calculating unit 233 and the area identifying unit 234 may be provided in the portable device 1, as in the variation illustrated in FIG. 6. In this case, the portable device storage 131 preliminarily stores reference values and coefficients for calculating distances L1, and also a threshold Lth. Further, in the present embodiment, the distance calculating unit 233 may be provided in the portable device 1, as in the variation illustrated in FIG. 7. In this case, the portable device storage 131 preliminarily stores reference values and coefficients for calculating distances L1. In both cases, it is possible to provide the keyless entry system 100 that identifies the location of the portable device 1 with higher accuracy based on signal strengths x of received measurement signals R, regardless of the type of the portable device 1.

Further, the present invention is not limited to the configurations described herein, and other elements may be combined with the above-described configurations. Variations and modifications may be made to the described subject matter without departing from the scope of the invention as set forth in the accompanying claims.

What is claimed is:

1. An in-vehicle device provided in a vehicle and comprising:
    a plurality of transmitting antennas;
    an in-vehicle device transmitter configured to transmit measurement signals via the plurality of respective transmitting antennas;
    an in-vehicle device receiver configured to receive, from a portable device, a measurement result signal that includes measurement data of received signal strengths of the respective measurement signals that have been transmitted from the plurality of respective transmitting antennas; and
    an in-vehicle device controller configured to calculate first distances from the portable device to a plurality of preset areas, based on differences between a reference received signal strength that is received from one transmitting antenna and each of the received signal strengths of the respective measurement signals that are received from a rest of the plurality of transmitting antennas included in the measurement result signal, and to identify an area to which the portable device belongs from the plurality of preset areas based on the first distances, said difference being calculated as $d_{ij}=x_i-x_j$,
    wherein the xi is the reference received signal strength and xj is the each of the received signal strengths that are received from the rest of the plurality of transmitting antennas, and
    wherein the reference received signal strength is received from the one transmitting antenna that is provided in a center of the vehicle.

2. The in-vehicle device according to claim 1, wherein the first distances are Mahalanobis distances or Euclidean distances.

3. The in-vehicle device according to claim 1, wherein the in-vehicle device controller calculates second distances from the portable device to the plurality of preset areas, based on the received signal strengths of the respective measurement signals included in the measurement result signal, and to identify an area to which the portable device belongs from the plurality of preset areas based on the first distances and the second distances.

4. The in-vehicle device according to claim 3, wherein the second distances are Mahalanobis distances or Euclidean distances.

5. The in-vehicle device according to claim 1, wherein the in-vehicle device transmitter includes one in-vehicle device transmitter connected to the plurality of transmitting antennas.

6. The in-vehicle device according to claim 1, wherein the in-vehicle device transmitter includes a plurality of in-vehicle device transmitters each connected to a corresponding transmitting antenna of the plurality of transmitting antennas.

7. The in-vehicle device according to claim 1, wherein the number of the plurality of transmitting antennas is 5 and the number of the rest of the plurality of transmitting antennas is 4.

8. A non-transitory recording medium storing a program for causing a computer to execute a process comprising:
    transmitting measurement signals from a plurality of respective transmitting antennas;
    receiving, from a portable device, a measurement result signal that includes measurement data of received signal strengths of the respective measurement signals that have been transmitted from the plurality of respective transmitting antennas; and
    calculating first distances from the portable device to a plurality of preset areas, based on differences between a reference received signal strength that is received from one transmitting antenna and each of the received signal strengths of the respective measurement signals that are received from a rest of the plurality of transmitting antennas included in the measurement result signal, and identifying an area to which the portable device belongs from the plurality of preset areas based on the first distances, said difference being calculated as $d_{ij}=x_i-x_j$,
    wherein the xi is the reference received signal strength and xj is the each of the received signal strengths that are received from the rest of the plurality of transmitting antennas, and
    wherein the reference received signal strength is received from the one transmitting antenna that is provided in a center of the vehicle.

9. A keyless entry system including a portable device and an in-vehicle device, the keyless entry system comprising:
    a received signal strength measuring unit configured to measure received signal strengths of a plurality of respective measurement signals that have been transmitted from a plurality of transmitting antennas;
    a distance calculating unit configured to calculate first distances from the portable device to a plurality of areas, based on differences between a reference received signal strength that is received from one transmitting antenna and each of the received signal strengths of the plurality of respective measurement signals that are received from a rest of the plurality of transmitting antennas; and an area identifying unit configured to identify an area to which the portable device belongs from the plurality of areas based on the first distances, said difference being calculated as $d_{ij}=x_i-x_j$, wherein the $x_i$ is the reference received signal strength and $x_j$ is the each of the received signal strengths that are received from the rest of the plurality of transmitting antennas, and wherein the reference received signal strength is received from the one transmitting antenna that is provided in a center of the vehicle.

* * * * *